United States Patent
Brummer (10) Patent No.: US 10,666,321 B2
(45) Date of Patent: May 26, 2020

(54) SAMPLING GATE FOR BROADBAND FREQUENCY RECONSTRUCTION

(71) Applicant: TEKTRONIX, INC., Beaverton, OR (US)

(72) Inventor: Noah Brummer, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 288 days.

(21) Appl. No.: 15/394,676

(22) Filed: Dec. 29, 2016

(65) Prior Publication Data

US 2018/0191400 A1 Jul. 5, 2018

(51) Int. Cl.
- *G01J 1/44* (2006.01)
- *H04B 3/54* (2006.01)

(52) U.S. Cl.
CPC .................. *H04B 3/542* (2013.01)

(58) Field of Classification Search
CPC .. H04B 10/60; H04B 10/611; H04B 10/6165; H04B 10/1121; H04B 10/671; G01J 3/1256; G01J 3/1895; G01J 3/28; G01J 3/2889; G01J 3/44; G01N 2021/656; G01N 21/65; G01N 21/658; G01N 2021/4709; G01N 2021/4716; G01N 21/49; G02B 6/12014; G02B 6/12021; G02B 6/4249; G02B 6/2861; G01D 5/35312
USPC ..................... 356/301; 250/227.23
See application file for complete search history.

(56) References Cited

U.S. PATENT DOCUMENTS

| | | | | |
|---|---|---|---|---|
| 5,489,771 A | * | 2/1996 | Beach | G01J 3/10 250/205 |
| 5,546,211 A | * | 8/1996 | Devon | H04B 10/114 398/202 |
| 6,147,799 A | * | 11/2000 | MacDonald | G02B 6/2861 359/380 |
| 6,392,219 B1 | * | 5/2002 | McCormick | H04B 10/6931 250/214 R |
| 8,810,301 B1 | * | 8/2014 | Evans | G11C 27/024 327/333 |
| 9,036,764 B1 | * | 5/2015 | Hossain | H03L 7/087 375/355 |
| 2008/0100483 A1 | * | 5/2008 | Pupalaikis | H03M 1/1009 341/118 |
| 2008/0310857 A1 | * | 12/2008 | Fuse | H04B 10/1121 398/154 |
| 2011/0105867 A1 | * | 5/2011 | Schultz | A61B 5/0059 600/316 |
| 2011/0229127 A1 | * | 9/2011 | Sakamoto | H04B 10/60 398/25 |
| 2016/0226449 A1 | * | 8/2016 | Watkins | H03F 1/0222 |

* cited by examiner

*Primary Examiner* — Sunghee Y Gray
(74) *Attorney, Agent, or Firm* — Miller Nash Graham & Dunn; Andrew J. Harrington (57) ABSTRACT

A sampling gate comprising a first frequency input coupled to a first frequency path from a broadband photodiode. The sampling gate also includes a positive bias input coupled to a positive offset portion of a second frequency path from the broadband photodiode. The sampling gate also includes a negative bias input coupled to a negative offset portion of the second frequency path from the broadband photodiode. The sampling gate combines a first frequency signal from the first frequency path and a second frequency signal from the second frequency path to create a combined broadband frequency signal from the broadband photodiode.

6 Claims, 7 Drawing Sheets

Convert an optical signal into a high frequency signal and a low frequency signal.
⌐ 301

Employ a variable gain amplifier to match a gain of the low frequency signal to a gain of the high frequency signal.
⌐ 303

Receive the high frequency signal, a positive portion of the low frequency signal, and a negative portion of the low frequency signal at a sampling gate.
⌐ 305

Combine the high frequency signal and the low frequency signal by employing an impulse unit to activate a first diode and a second diode in the sampling gate to output a charge for sampling.
⌐ 307

Employ an analog to digital converter to convert the combined broadband frequency signal into a digital signal.
⌐ 309

SAMPLING GATE FOR BROADBAND FREQUENCY RECONSTRUCTION

FIELD OF THE INVENTION

This disclosure is directed to a system and methods for testing broadband signals, and, more particularly, to a sampling gate for reconstructing a complete frequency response of a broadband photodiode in test and measurement system, such as an oscilloscope.

BACKGROUND

Test and measurement systems are designed to receive signals, sample the signals, and display the results. For example, a test and measurement system may be implemented to convert an optical signal into an electrical signal for testing and display to a user. However, physical limitations of optical conversion technology may limit the versatility of the system. For example, a specially designed system may convert an optical signal of a particular frequency to an electrical signal of a corresponding frequency. A different system may be specially designed for conversion of optical signals of different frequency ranges. A general purpose test and measurement system for conversion of a broad range of frequencies may be desirable.

Aspects of the invention address these and other issues.

DETAILED DESCRIPTION

The aspects of the present disclosure are susceptible to various modifications and alternative forms. Specific aspects have been shown by way of example in the drawings and are described in detail herein below. However, it should be noted that the examples disclosed herein are presented for the purposes of clarity of discussion and are not intended to limit the scope of the general concepts disclosed to the specific aspects described herein unless expressly limited. As such, the present disclosure is intended to cover all modifications, equivalents, and alternatives of the described aspects in light of the attached drawings and claims.

References in the specification to aspect, example, etc., indicate that the described item may include a particular feature, structure, or characteristic. However, every disclosed aspect may or may not necessarily include that particular feature, structure, or characteristic. Moreover, such phrases are not necessarily referring to the same aspect unless specifically noted. Further, when a particular feature, structure, or characteristic is described in connection with a particular aspect, such feature, structure, or characteristic can be employed in connection with another disclosed aspect whether or not such feature is explicitly described in conjunction with such other disclosed aspect. Further, numerical terms such as first, second, third, etc. may be employed herein as adjectives and/or adverbs for the purposes of generally distinguishing similar components, structures, signals, etc. Such numerical terms should not be considered limiting as to order unless context specifically notes a contrary interpretation.

Disclosed herein is a test and measurement system configured to convert a broadband spectrum of optical signals into an electrical domain for capture and/or display to an end user. A broadband photodiode converts an optical signal into a broadband electrical signal. The electrical signal is converted into low frequency signal and a high frequency signal, which are forwarded along a low frequency path and a high frequency path, respectively. A variable gain amplifier is employed on the low frequency path to match the gain of the two signal portions. The two paths are coupled via a sampling gate. The sampling gate employs a pair of diodes biased into an off position. The high frequency path is coupled between the diodes to introduce the high frequency signal. The low frequency signal is coupled to the bias inputs, which causes the sampling gate to act as a summer. An impulse unit is employed to switch the diodes on at a pre-determined sampling rate. Charge from both the low frequency signal and the high frequency signal are converted to a voltage signal by a charge amplifier, and digitized by an analog to digital converter (ADC) for sampling as a combined broadband frequency signal.

Figure 1:
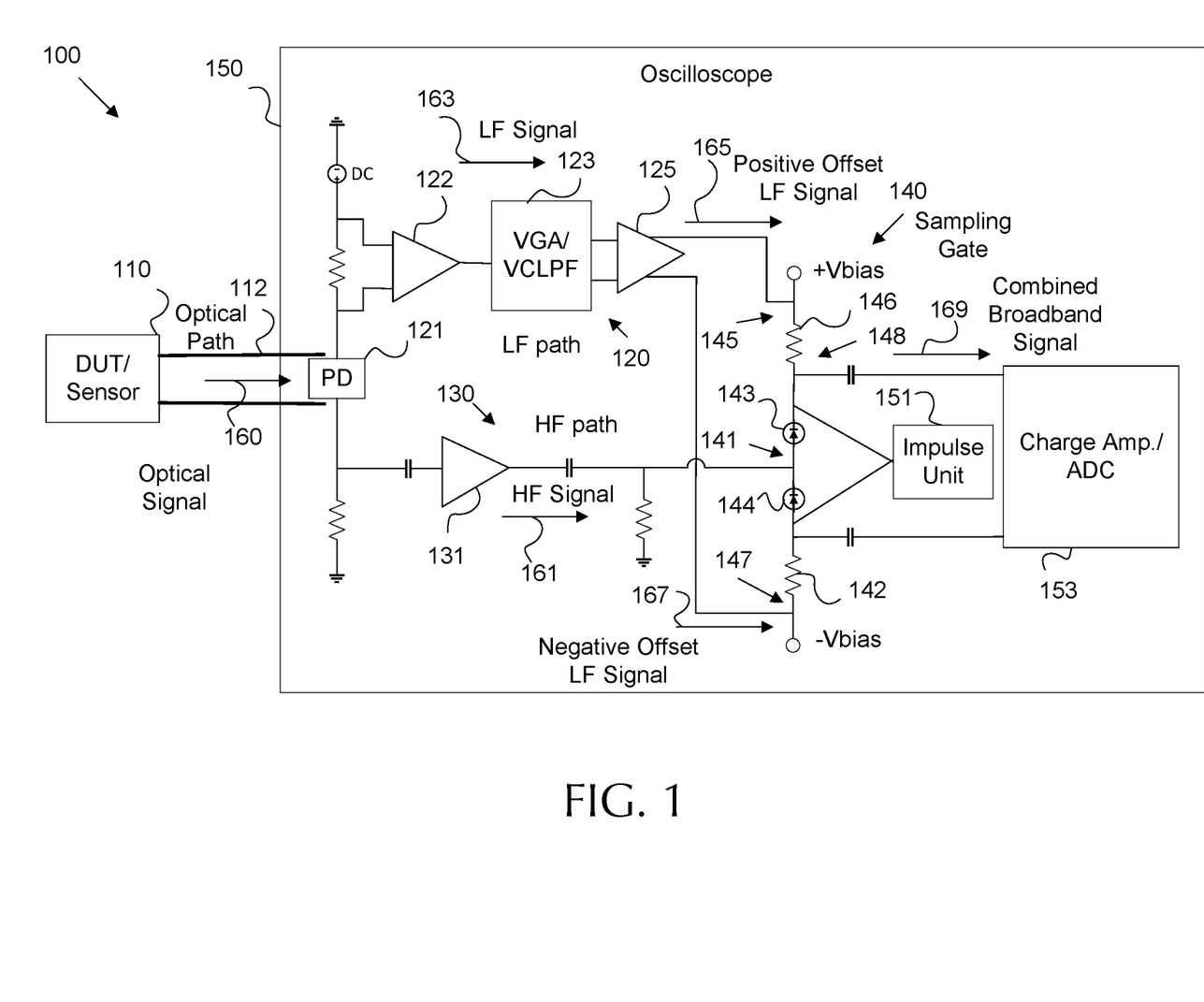
FIG. 1 is a schematic diagram of an aspect of a test and measurement system with an electrical sampling gate for use with a broadband photodiode.

FIG. 1 is a schematic diagram of an aspect of a test and measurement system 100 with an electrical sampling gate 140 for use with a broadband photodiode (PD) 121. System 100 includes an oscilloscope 150 configured to receive an optical signal 160 from a DUT 110, convert the optical signal into an electrical low frequency (LF) signal 163 and an electrical high frequency (HF) signal 161, and combine the signals into a combined broadband frequency signal 169 for sampling.

The DUT 110 is any device configured to transmit an optical signal 160 for testing purposes. For example, the DUT 110 may contain an optical modulator for modulating an optical carrier to create the optical signal. In some embodiments, the DUT 110 generates data in the electrical domain, and a sensor attached to the DUT 110 convert the electrical data into the optical signal 160. The DUT 110 is coupled to the oscilloscope 150 via an optical path 112. The optical path 112 may be any coupling capable of transporting an optical signal 160. For example, the optical path 112 may be embodied as an optical fiber made of transparent materials. As another example, the optical path 112 may be an air gap, in which case the DUT 110 is aligned with the oscilloscope 150. One skilled in the art will understand that many optical path 112 types may be employed without departing from the scope of the present disclosure.

The oscilloscope 150 is any device configured to sample an electrical signal and employ corresponding data to represent a waveform that depicts the electrical signal. For example, the oscilloscope 150 may store waveform data in memory for display by other devices, display the waveform on an attached display, and/or provide mathematical representations of the sampled waveform. As a specific example, the oscilloscope 150 may be configured as an equivalent time sampling oscilloscope. An equivalent time sampling oscilloscope is configured to sample a repeating signal at different points of the signal's period and combine the samples to create an equivalent waveform. An equivalent time sampling oscilloscope may sample the signal more slowly than a real time oscilloscope, and hence may be achieve similar results for repeating waveforms without the expense accompanying a high sampling rate as required by a real time oscilloscope.

The oscilloscope 150 includes a broadband photodiode 121 for converting the optical signal 160 into an electrical signal. A photodiode 121 is any component that alters electrical current flow based on the presence or absence of incident light, for example from an optical signal 160. Different photodiode materials exhibit different frequency response characteristics. Accordingly, a broadband photodiode 121 may be constructed from multiple photodiodes/optical detectors that respond to different frequencies. As such, the broadband photodiode 121 may output different electrical signals at different frequencies to generate a broadband electrical signal. The broadband electrical signal is forwarded along both a HF path 130 and an LF path 120.

The HF path 130 receives the broadband electrical signal. The HF path 130 is associated with a cutoff frequency associated with the configuration of the HF path 130. For example, LF portions of the electrical signal may not pass through capacitive networks in the HF path 130. Accordingly, the HF path 130 conducts an HF signal 161 toward a sampling gate 140, while blocking an LF signal 163. The HF path 130 employs an amplifier 131 to increase the gain of the HF signal 161 to level sufficient for sampling. The HF path 130 may also contain resistive and capacitive elements as desired to appropriately conduct the HF signal 161.

The LF path 120 also receives the broadband electrical signal. The LF path 120 is associated with a cutoff frequency associated with the configuration of the LF path 120. For example, HF portions of the electrical signal may not pass through amplifier 122. Accordingly, the LF path 120 conducts an LF signal 163 toward the sampling gate 140, while blocking the HF signal 161. The LF path 120 employs amplifiers 122 and 125 to increase the gain of the LF signal 163 to match the gain of the HF signal 161 in the HF path 130. The LF path 120 may include resistive elements to conduct the LF signal 163. The LF path 120 may also employ a direct current (DC) power source to power the broadband photodiode 121 and the remainder of the circuit. The LF path 120 may also include a variable gain amplifier (VGA) 123. The VGA 123 is configured to controllably vary the gain of the LF signal 163 to match the LF signal 123 gain with the gain of the HF signal 161. The VGA 123 may also employ a voltage controlled low pass filter (VCLPF) and other components to support matching the LF signal 123 to the HF signal 161 for combination into a relatively seamless spectrum. Further, the amplifier 125 is configured to split the LF signal 163 into a positive offset LF signal 165 and a negative offset LF signal 167 for application to the sampling gate 140. The positive offset LF signal 165 and the negative offset LF signal 167 have the same magnitude and polarity so as to modulate the offset of the sampling gate 140. As noted above, the HF path 130 and the LF path 120 each conduct signals that are bounded by a cutoff frequency. When the cutoff frequencies are aligned, any signal received from the broadband photodiode 121 is conducted along one of the paths. The frequency at which a signal crosses over from high frequency to low frequency for transmission purposes is referred to as a crossover frequency. The crossover frequency is a threshold resulting from the design of the LF path 120 and the HF path 130, and may be adjusted by altering the design of the paths (e.g. based on amplifier and/or capacitor selection).

The sampling gate 140 as configured combines the HF signal 161 and the LF signal 163 into a combined broadband frequency signal 169, which is substantially similar to the optical signal 160 received at the broadband photodiode 121. The sampling gate 140 includes a high frequency input 141 coupled to the HF path 130, a positive bias input 145 coupled to the positive offset portion of the LF path 120, and a negative bias input 147 coupled to the negative offset portion of the LF path 120. The sampling gate 140 includes a first diode 143 and a second diode 144. Diodes represented by 143 and 144 may be individual diodes or some combination of multiple diodes in series and/or parallel. The diodes 143-144 are reverse biased into a state that prevents current flow. The diodes 143-144 can be selectively activated by an impulse unit 151 for sampling purposes as discussed below. The high frequency input 141 couples the HF path 130 to the sampling gate 140 between the diodes 143-144, which allows charge from the HF signal 161 to flow for sampling when the diodes 143-144 are activated. The positive bias input 145 is coupled to the diode 143 via a resistor 146. The negative bias input 145 is coupled to the diode 144 via a resistor 147. Accordingly, the positive offset LF signal 165 and the negative offset LF signal 167 are added to the positive bias voltage (+Vbias) and the negative bias voltage (−Vbias), respectively, and applied to the diodes 143 and 144, respectively. The sampling gate 140 acts as a summer when the diodes 143-144 are activated. Hence, the positive offset LF signal 165, negative offset LF signal 167, and HF signal 161 are all combined into a combined broadband frequency signal 169 when the diodes 143 and 144 are activated.

As noted above, the oscilloscope 150 also includes an impulse unit 151. An impulse unit 151 is a component capable of controllably applying an impulse signal to the diodes 143-144 at a sample rate. The impulse unit 151 is coupled to the diodes 143 and 144 in the sampling gate 140. When the impulse unit 151 provides an impulse, the diodes 143 and 144 are activated, causing charge to flow to an output 148 of the sampling gate 140. Accordingly, the impulse unit 151 activates the diodes 143-144 to sum the LF signal 163 (e.g. via positive offset LF signal 165 and negative offset LF signal 167) and the HF signal 161 into the combined broadband frequency signal 169, which is then output at sampling gate 140 output 148. The output 148 may be coupled to the first resistor 146 and diode 143 as shown for outputting a first portion of a combined broadband frequency signal from the broadband photodiode.

The combined broadband frequency signal 169 is conducted to an analog to digital converter (ADC) 153. The ADC 153 is coupled to the sampling gate 140 and if configured to convert the combined broadband frequency signal 169 into a digital signal. The ADC 153 may also include a charge amplifier, filters, and/or other circuits/functions for conditioning the combined broadband frequency signal 169 during conversion. As charge flows when the impulse unit 151 activates the diodes 143-144, the impulse unit 151 controls the rate that samples are received at the ADC 153 and hence controls the sampling rate employed by the oscilloscope 150. After conversion by the ADC 153, the digital signal may be stored in memory, displayed to a user via a display, manipulated via software filters, etc. It should be noted that, while FIG. 1 depicts a sampling gate 140 combining signals of varying frequencies from a photodiode 121, the sampling gate 140 configuration can be employed to combined signals of varying frequencies from any source. As such, the configuration of oscilloscope 150 is exemplary. The configuration of the sampling gate 140 is generally applicable, and should not be limited to use in conjunction with converted optical signals.

Figure 2:
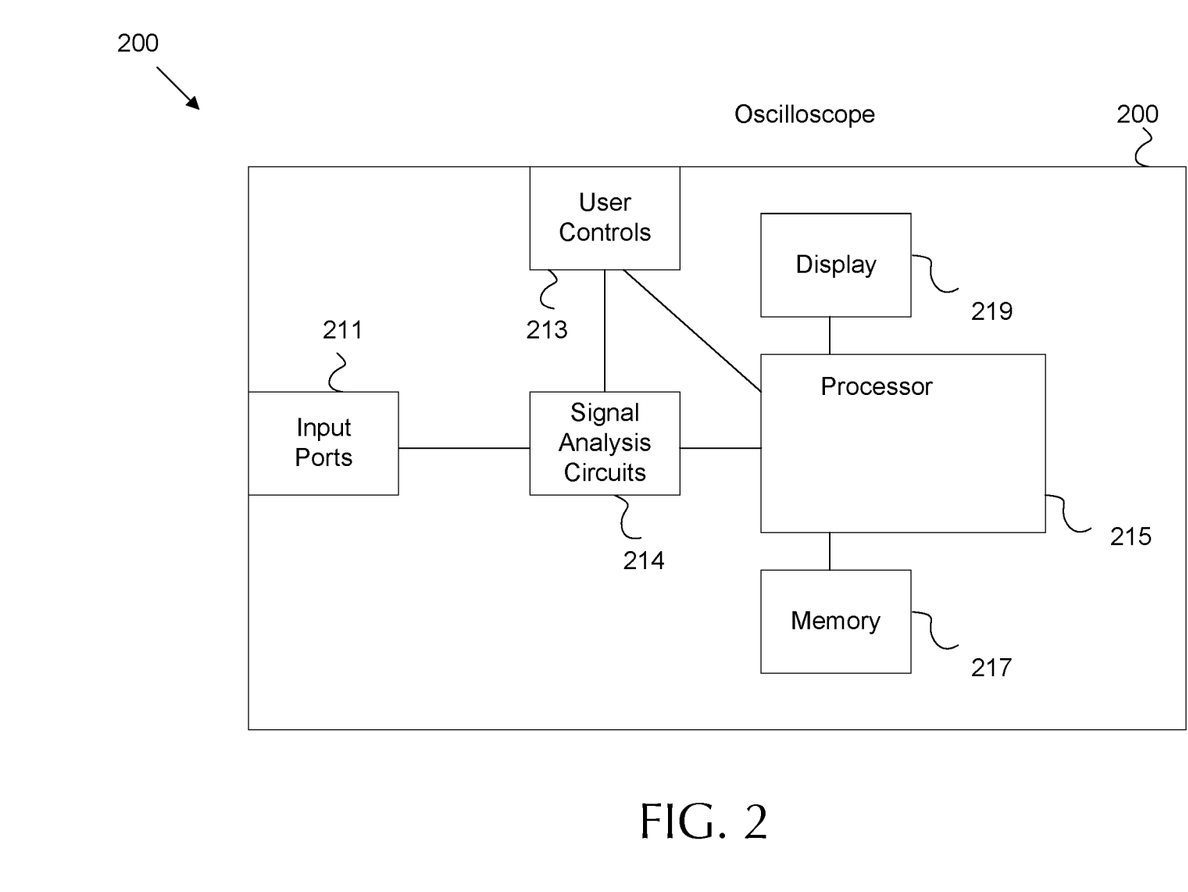
FIG. 2 is a schematic diagram of an aspect of a test and measurement system for sampling an optical input from a Device Under Test (DUT).

FIG. 2 is a schematic diagram of an aspect of a test and measurement system 200 for sampling an optical input from a DUT, such as optical signal 160 and DUT 110, respectively. Oscilloscope 150 may be implemented in a test and measurement system 200. The test and measurement system 200 may also be configured to implement method 300, for example by employing a sampling gate 140, and/or any other method disclosed herein. Oscilloscope 200 comprises signal input ports 211 which may be any electrical and/or optical ports, receivers, etc. configured to accept an input signal for testing purposes, such an optical signal from a DUT. Input ports 211 may include a broadband photodiode, such as photodiode 121. Input ports 211 are coupled to signal analysis circuits 214, for example by a low frequency path and a high frequency path. The signal analysis circuits 214 may comprise a sampling gate, an ADC, amplifiers, samplers, any other component disclosed in oscilloscope 150, and/or other components for signal sampling and/or signal conditioning. Signal analysis circuits 214 receive input signals from the input ports 211, perform sampling and other signal analysis on the input signals to convert analog signals into digital signals, and/or perform method 300. Signal analysis circuits 214 may be implemented as one or more application specific integrated circuits (ASICs), digital signal processor (DSPs), or other processing circuitry. Signal analysis circuits 214 may also be configured to store input signal data to memory for further processing. Signal analysis circuits 214 are coupled to processor 215, which may be implemented as a general purpose processor. Processor 215 is configured to execute instructions from memory 217 and perform any methods and/or associated steps indicated by the instructions. Memory 217 may be implemented as processor cache, random access memory (RAM), read only memory (ROM), solid state memory, hard disk drive(s), or any other memory type. Memory 217 acts as a non-transitory medium for storing data, computer program products, and other instructions, and providing such data/products/instruction to the processor 215 for computation as needed.

User controls 213 are coupled to the processor 215 and signal analysis circuits 214. User controls 213 may comprise strobe inputs, gain controls, triggers, display adjustments, power controls, or any other controls employable by a user to display or alter a display of an input signal on display 219. Display 219 may be a digital screen or a cathode ray tube based display. Display 219 comprises a plurality of graticules for displaying corresponding input signals. Accordingly, oscilloscope 200 may receive a broadband optical signal, convert the optical signal into a low frequency signal and a high frequency signal, combine the signals into a combined broadband frequency signal via a sampling gate, convert the combined broadband frequency signal into a digital signal, store the digital signal in memory 217, and/or display the digital signal on display 219.

Figure 3:
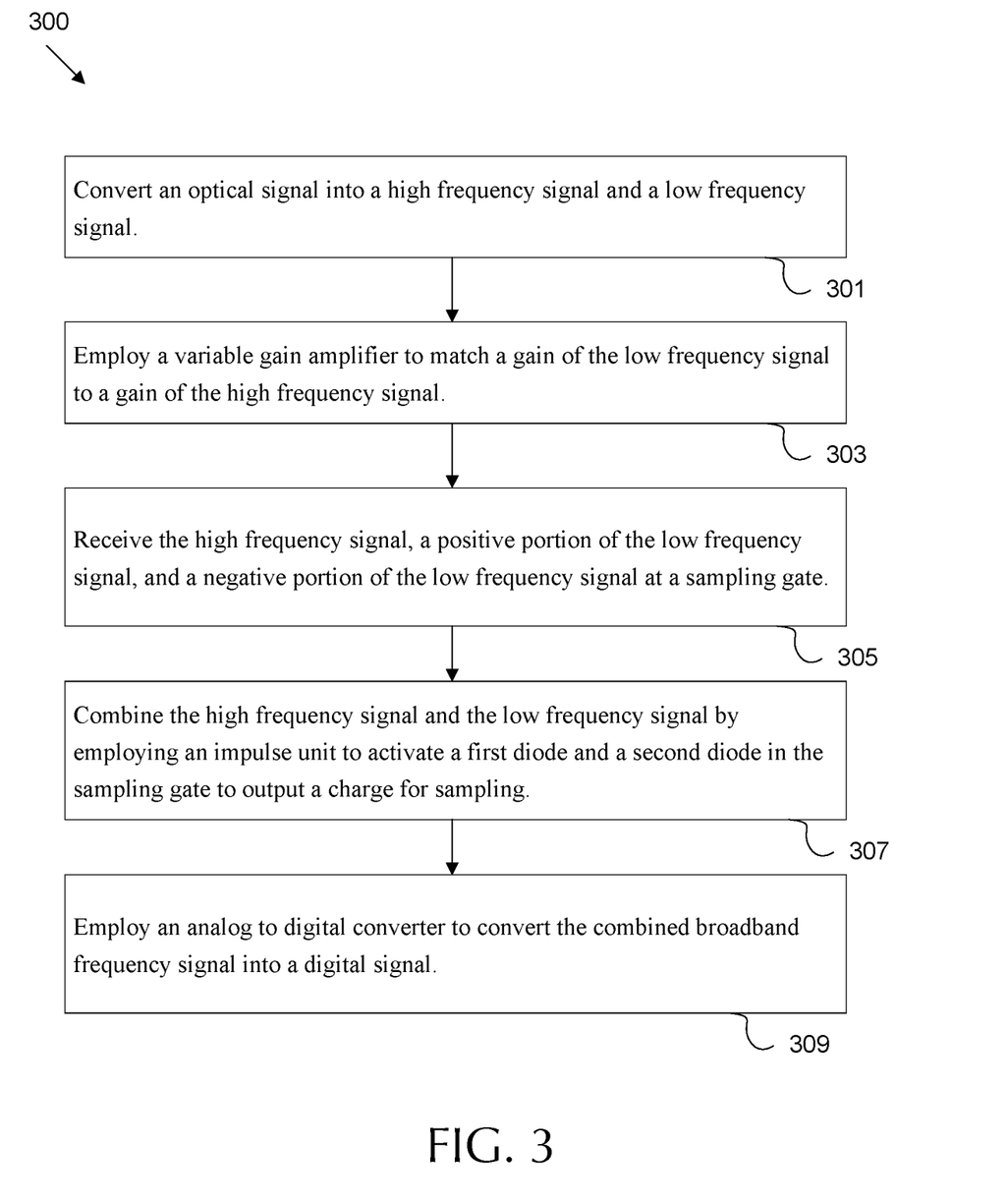
FIG. 3 is a flowchart of an example method for converting an optical signal into a broadband frequency signal for sampling via a sampling gate.

FIG. 3 is a flowchart of an example method 300 for converting an optical signal into a broadband frequency signal for sampling via a sampling gate, for example by employing components as disclosed in oscilloscope 150. Method 300 initiates when an optical signal is received at a broadband photodiode, such as broadband photodiode 121. At block 301, the optical signal is converted, by the broadband photodiode, into a broadband electrical signal. The signal is forwarded along a high frequency path and a low frequency path, creating a high frequency signal and a low frequency signal, respectively. At block 303, a variable gain amplifier is employed to match a gain of the low frequency signal to a gain of the high frequency signal. While the variable gain amplifier may be positioned in the low frequency path as disclosed in oscilloscope 150, one skilled in the art will understand that gain matching may also be accomplished by employing a variable gain amplifier in the high frequency path in some embodiments. At block 305, the high frequency signal is received at a high frequency input of a sampling gate. Further, a positive offset portion of the low frequency signal is received at a positive bias input of the sampling gate. Also, a negative offset portion of the low frequency signal is received at a negative bias input of the sampling gate. At block 307, the positive offset portion of the low frequency signal, the negative offset portion of the low frequency signal, and the high frequency signal into a combined broadband frequency signal. The signals are combined by employing an impulse unit to activate a first diode and a second diode in a sampling gate, allowing charge to flow and combine for output from the sampling gate for sampling. At block 309, an analog to digital converter is employed to convert the combined broadband frequency signal into a digital signal. The digital signal may then be stored in memory and/or displayed to a user. For example, the method 300 may be implemented by employing a sampling gate, a broadband photodiode, a first diode, and a second diode contained in an equivalent time sampling oscilloscope.

Figure 4:
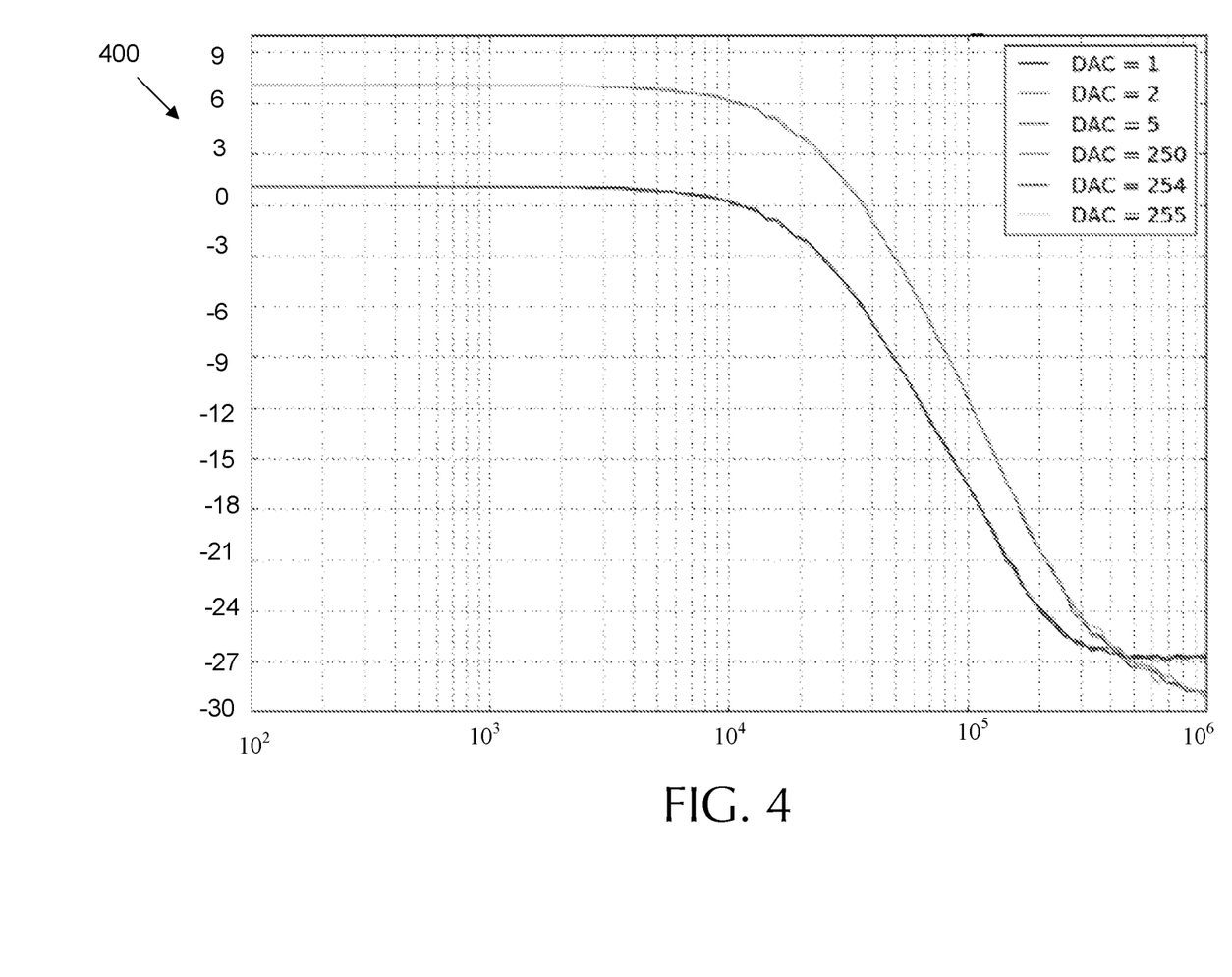
FIG. 4 is a graph illustrating frequency responses of an example electrical sampling gate at various Digital to Analog Converter (DAC) settings in the Variable Gain Amplifier (VGA).

FIG. 4 is a graph 400 illustrating frequency responses of an example electrical sampling gate, such as sampling gate 140, at various DAC settings in the VGA, such as VGA 123. Graph 400 depicts amplitude in units of decibels (dB) on the vertical axis and frequency in units of Hertz (Hz) on the horizontal axis. As shown, the VGA can be set to multiple levels, but the overall frequency response of the circuit is substantially similar. Accordingly, a sampling gate 140 can provide a broadband signal with a consistent frequency response over a large number of variable gain settings and hence can be easily tuned to match amplitudes for a wide range of HF and LF signals.

Figure 5:
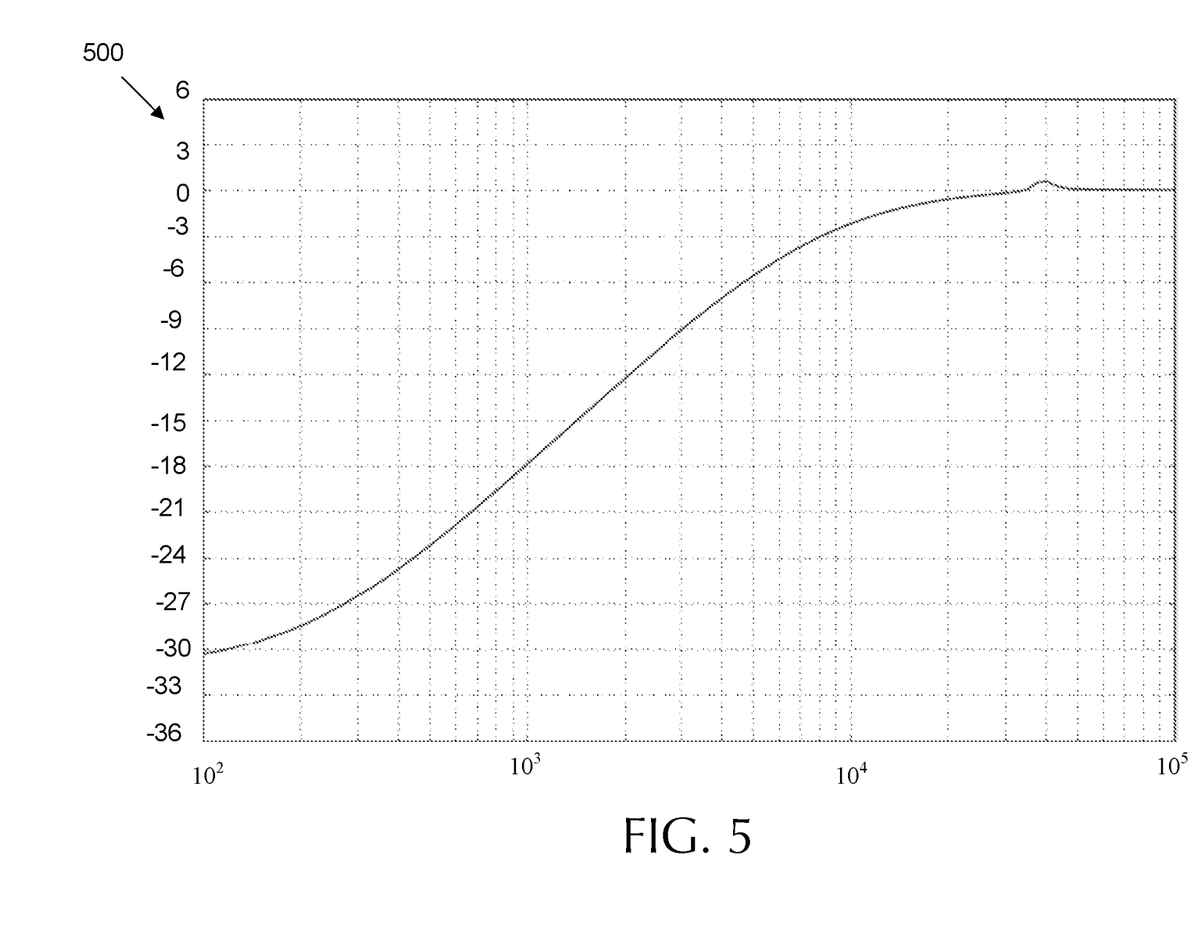
FIG. 5 is a graph illustrating a cutoff frequency response of a high frequency path of an example electrical sampling gate.

FIG. 5 is a graph 500 illustrating a cutoff frequency response of a high frequency path, such as HF path 130, of an example electrical sampling gate. Graph 500 depicts amplitude in units of dB on the vertical axis and frequency in units of Hz on the horizontal axis. As shown, use of the high frequency path at lower frequencies results in an attenuated amplitude response, which indicates that charge is not flowing. At higher frequencies, the amplitude approaches zero dB, indicating that charge is passing through the path unattenuated. Accordingly, the high frequency path acts as a high pass filter by conducting high frequency signals and blocking low frequency signals. The frequency range where the path converts from a blocking behavior to a pass through behavior is the cutoff frequency. In graph 500, the −3 dB cutoff frequency is approximately 8 kilohertz (kHz).

Figure 6:
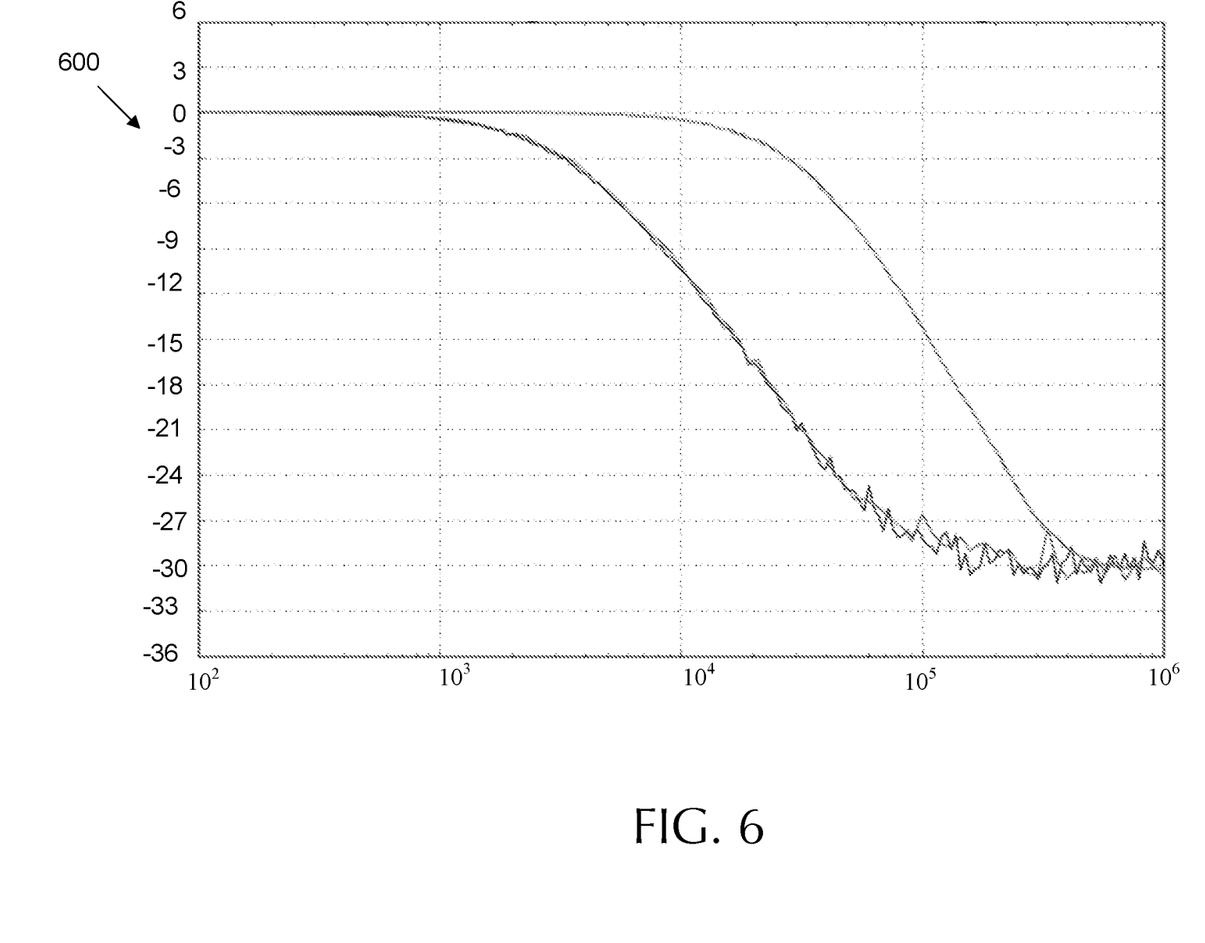
FIG. 6 is a graph illustrating cutoff frequency responses of a low frequency path of an example electrical sampling gate at various VGA DAC settings.

FIG. 6 is a graph 600 illustrating cutoff frequency responses of a low frequency path, such as LF path 120, of an example electrical sampling gate at various VGA DAC settings. Graph 600 depicts amplitude in units of dB on the vertical axis and frequency in units of Hz on the horizontal axis. As shown, use of the low frequency path at higher frequencies results in a attenuated amplitude response, which indicates that charge is not flowing. At lower frequencies, the amplitude approaches zero dB, indicating that charge is passing through the path unattenuated. Accordingly, the low frequency path acts as a low pass filter by conducting low frequency signals and blocking high frequency signals. As such, the low frequency path employs a frequency response that is substantially inverse to the high frequency path as depicted in graph 500. A broadband spectrum pass through may result from adding the behavior shown in graph 500 to the behavior shown in graph 600. However, to pass all frequency bands through, the cutoff frequency of the low frequency path should occur at a substantially similar frequency to the cutoff frequency of the high frequency path. Graph 600 shows that the cutoff frequency of the low frequency path can be adjusted by varying DAC settings in the VGA without affecting the gain of the passband where the passband is any frequency range not blocked (e.g. below the cutoff frequency). Thus, the low frequency path can be matched to the high frequency path to obtain a common crossover frequency.

Figure 7:
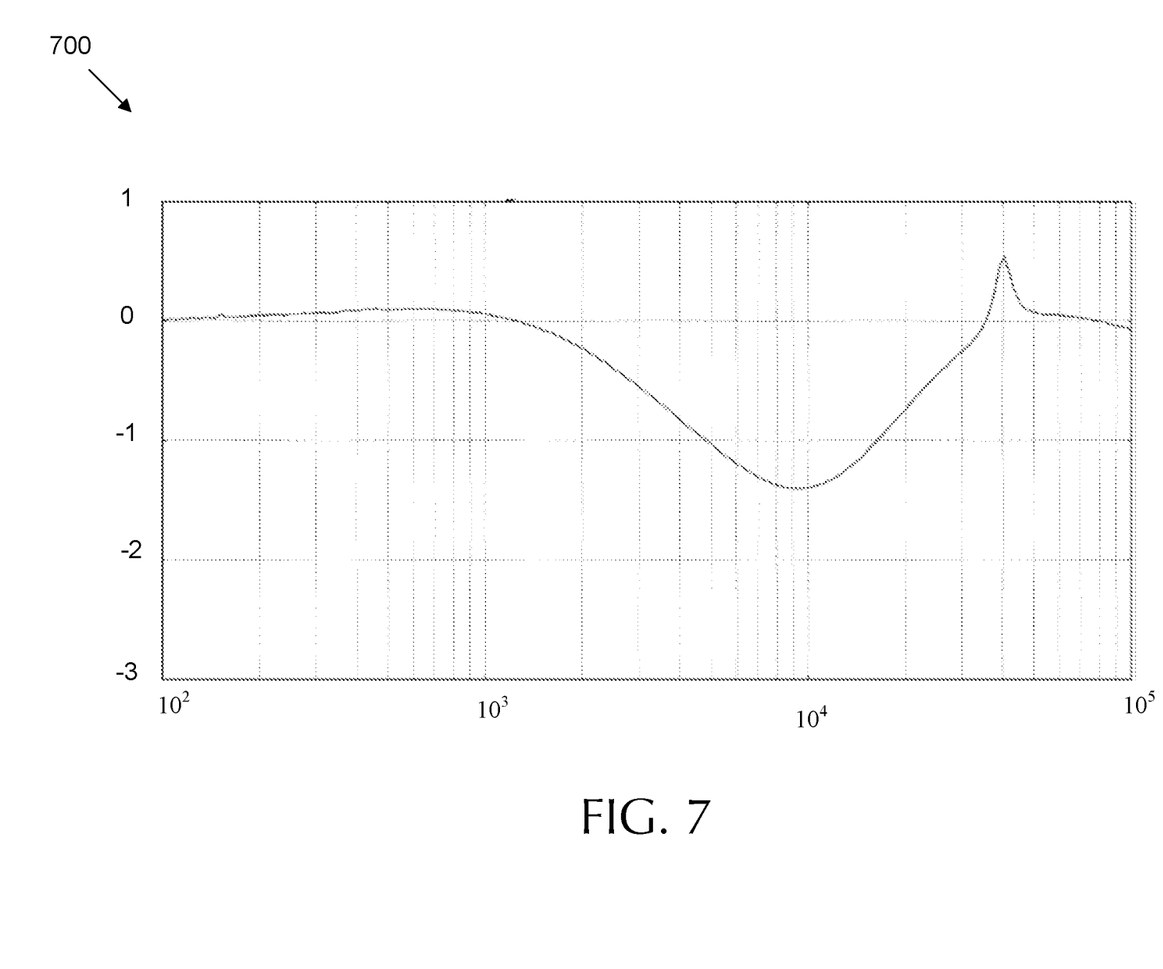
FIG. 7 is a graph illustrating a frequency response of an example electrical sampling gate over a crossover frequency range.

FIG. 7 is a graph 700 illustrating a frequency response of an example electrical sampling gate, such as sampling gate 140, over a crossover frequency range. Graph 700 depicts amplitude in units of dB on the vertical axis and frequency in units of Hz on the horizontal axis. Graph 700 shows that matched high frequency and low frequency paths, when used together, provide a relatively flat frequency response over a broadband spectrum, indicating that charge is flowing at all frequencies depicted in the graph 700. It should be noted that graphs 500 and 600 show amplitude change between about zero and about 33 dB, while graph 700 shows amplitude changes between about 0.5 and about −1.5 dB. As such, the amplitude changes in graph 700 are relatively small. Further, additional fine tuning to the VGA may result in even smaller amplitude variations over the entire broadband spectrum.

Aspects of the invention may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the invention may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the technologies disclosed herein are provided below. An embodiment of the technologies may include any one or more, and any combination of, the examples described below.

[Insert Global Claim Set Here]

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Although specific aspects of the invention have been illustrated and described for purposes of illustration, it will be understood that various modifications may be made without departing from the spirit and scope of the invention. Accordingly, the invention should not be limited except as by the appended claims.

I claim:

1. A test and measurement system comprising:
   a broadband photodiode for converting an optical signal into an electrical signal;
   a high frequency path for conducting a high frequency portion of the electrical signal;
   a low frequency path for conducting a low frequency portion of the electrical signal; and
   a sampling gate for combining the high frequency portion of the electrical signal and the low frequency portion of the electrical signal into a combined broadband frequency signal the sampling gate including:
     a high frequency input coupled to the high frequency path from the broadband photodiode;
     a positive bias input coupled to a positive offset portion of the low frequency path from the broadband photodiode; and
     a negative bias input coupled to a negative offset portion of the low frequency path from the broadband photodiode.

2. The test and measurement system of claim 1, wherein the sampling gate further includes:
   a first diode coupling the high frequency input to the positive bias input; and
   a second diode coupling the high frequency input to the negative bias input.

3. The test and measurement system of claim 2, further comprising an impulse unit coupled to the first diode and the second diode, the impulse unit configured to provide an impulse to activate the first diode and the second diode to output a charge for sampling.

4. The test and measurement system of claim 1, further comprising an analog to digital converter coupled to the sampling gate, the analog to digital converter configured to convert the combined broadband frequency signal into a digital signal.

5. The test and measurement system of claim 1, wherein the test and measurement system is an equivalent time sampling oscilloscope, further comprising:
   an input port for receiving the optical signal, the input port including the broadband photodiode;
   a signal analysis circuit coupled to the input port, the signal analysis circuit including the sampling gate; and
   a processor coupled to the signal analysis circuit and configured to control the signal analysis circuit such that the combined broadband frequency signal is sampled at different points of a period of the combined broadband frequency signal, and to combine the samples to produce an equivalent waveform of the combined broadband frequency signal.

6. The test and measurement system of claim 1, wherein the low frequency path includes a variable gain amplifier for matching a gain of the low frequency portion of the electrical signal with a gain of the high frequency portion of the electrical signal.

\* \* \* \* \*